United States Patent
Dempo

(10) Patent No.: US 6,934,288 B2
(45) Date of Patent: Aug. 23, 2005

(54) FRAGMENTATION PROCESSING DEVICE AND FRAGMENTATION PROCESSING APPARATUS USING THEREOF

(75) Inventor: Hiroshi Dempo, Tokyo (JP)

(73) Assignee: NEC Corporation, Tokyo (JP)

(*) Notice: Subject to any disclaimer, the term of this patent is extended or adjusted under 35 U.S.C. 154(b) by 867 days.

(21) Appl. No.: 09/842,646

(22) Filed: Apr. 27, 2001

(65) Prior Publication Data

US 2001/0036185 A1 Nov. 1, 2001

(30) Foreign Application Priority Data

Apr. 28, 2000 (JP) .................................. 2000-134278

(51) Int. Cl.[7] .......................... H04L 12/28; H04J 3/24
(52) U.S. Cl. ................... 370/394; 370/395.1; 370/474
(58) Field of Search ......................... 370/395.1, 394, 370/474, 230, 310.1, 238.1, 395.52, 411, 419, 462, 464, 473

(56) References Cited

U.S. PATENT DOCUMENTS

| 5,497,371 | A | * | 3/1996 | Ellis et al. .................. 370/412 |
| 5,892,761 | A | * | 4/1999 | Stracke, Jr. ............... 370/395.1 |
| 6,212,190 | B1 | * | 4/2001 | Mulligan ..................... 370/400 |
| 6,341,129 | B1 | * | 1/2002 | Schroeder et al. .......... 370/354 |
| 6,557,031 | B1 | * | 4/2003 | Mimura et al. ............. 709/218 |
| 6,570,849 | B1 | * | 5/2003 | Skemer et al. ........... 370/230.1 |
| 6,711,176 | B1 | * | 3/2004 | Pezeshki-Esfahani ....... 370/466 |
| 6,731,598 | B1 | * | 5/2004 | Beliveau et al. ............ 370/228 |
| 6,781,992 | B1 | * | 8/2004 | Rana et al. ................. 370/394 |
| 6,785,239 | B1 | * | 8/2004 | Tasker ........................ 370/238 |
| 6,813,279 | B1 | * | 11/2004 | Trainin ....................... 370/466 |

FOREIGN PATENT DOCUMENTS

| JP | 10-190734 A | 7/1998 |
| JP | 11-168492 | 6/1999 |
| JP | 2000-69071 A | 3/2000 |
| JP | 2000-101613 A | 4/2000 |

* cited by examiner

*Primary Examiner*—Andy Lee
(74) *Attorney, Agent, or Firm*—Sughrue Mion, PLLC

(57) ABSTRACT

A fragmentation processing device for performing a fragmentation process only with hardware based on a set MTU size. On creating IP packets by combining fixed packets, there is acquired the largest number N' of the fixed packets that will be an IP packet of a size smaller than the MTU size. It assembles an IP packet at the time of acquiring the N' pieces of fixed packets.

14 Claims, 3 Drawing Sheets

FRAGMENTATION PROCESSING DEVICE AND FRAGMENTATION PROCESSING APPARATUS USING THEREOF

BACKGROUND OF THE INVENTION

The present invention relates to a fragmentation processing device and in particular, to a fragmentation processing device for, in the case of accommodating various lines to transfer IP packets, performing a fragmentation process at high speed only with hardware and a fragmentation processing apparatus implementing thereof.

In general, a router and the like on an IP network has a fixed size of a packet to be sent and received according to specifications of an accommodated link layer protocol. Here, a size of an IP packet sendable on the sending side is called an MTU (Maximum Transfer Unit) size and a size of an IP packet receivable on the receiving side is called an MRU (Maximum Receive Unit) size.

These MTU size and MRU size can have different values set for an input line and an output line respectively. Thereby there are cases where an apparatus on the IP network such as a router has to execute a fragmentation process. That is, a fragmentation process is required in the case where an IP packet of a size larger than the MTU size has to be sent. For instance, in the case of sending an IP packet of IP packet length A to the output line of which MTU size is B (A>B), the router cannot send this IP packet without dividing it into a size B or smaller. In this case, a fragmentation process is executed and an IP packet of the above size A is divided into IP packets of the MTU size or smaller and then sent. As for this fragmentation process, there is a process described in IETF RFC1812 Requirements for IP version 4 Routers, for instance.

However, this fragmentation process is not a process executed on every router or the like, in spite of the router or the like has a function of fragmentation process in general. To be more specific, it may not be required in the case where routes are designed so that the MTU size coincides with the MRU size. For that reason, the fragmentation process has been conventionally executed by software.

There are a variety of physical line types existing currently, and each of them has a different MRU size. For this reason, the fragmentation process is frequently executed when transferring IP packets between different physical lines. In this case, as the fragmentation process is executed by software as aforementioned, there is a problem pointed out that an IP packet transfer process takes a lot of time.

In addition, there is an another problem that, as the conventional fragmentation process by software is executed after receiving the entire IP packets, the time for starting the fragmentation process delays in the case of receiving long IP packets so that the IP packet transfer process takes a lot of time.

To solve these problems, Japanese Patent Laid-Open No. Hei 11-168492 discloses a conventional technology on a router apparatus implementing a function of examining the minimum MTU size of a route on which the IP packets are transferred on an IP network.

However, the route on which the IP packets are transferred can be different depending on a state of this network, and so it is not always one. Thus, in the case where the IP packets are transferred to a route different from the examined route, the fragmentation process executes on the network.

In addition, all the router apparatuses or the like are required to implement the above technology.

The present invention has been achieved considering the above problems, and its object is to provide a fragmentation processing device. In addition, another object is to provide a fragmentation processing apparatus such as a router implementing a fragmentation processing device.

SUMMARY OF THE INVENTION

To attain such objects, the invention of the fragmentation processing device is the fragmentation processing device for having fixed packets with IP (internet protocol) packets divided into payload portions written inputted in order from one including a head portion of the IP packets to one including a last portion thereof, characterized by having fragmentation processing determination means for acquiring, from the fixed packets including an IP packet header of the IP packets, information on a size of the IP packets included in the IP packet header, comparing the size of the IP packets with an MTU size, and determining, in the case where the size of the IP packets is larger than the MTU (Maximum Transfer Unit) size, that the IP packets require to have a fragmentation process executed, IP header processing means for, in the case where it is determined by the fragmentation processing determination means that the IP packets require to have a fragmentation process executed, extracting the IP packet header from the fixed packets including IP packet header, and creating an IP packet header after the fragmentation process from the IP packet header, and IP packet assembling means for, in the case where it is determined by the fragmentation processing determination means that the IP packets require to have a fragmentation process executed, creating a plurality of IP packets of a size smaller than the MTU size to which IP packet payloads of the IP packets included in the fixed packets are added behind the IP packet header created by said IP header processing means in the order in which they are inputted to the fragmentation processing device, sending these IP packets, and in the case where it is determined by the fragmentation processing determination means that the IP packets do not require to have a fragmentation process executed, assembling IP packets from the fixed packets in the order in which they are inputted to the fragmentation processing device and sending them outside the device.

Furthermore, present invention is characterized by further having in the fragmentation processing device aforementioned, a number of assembled fixed packets calculating means for, in the case where it is determined by said fragmentation processing determination means that said IP packets require to have a fragmentation process executed, calculating N from a payload size of the fixed packets, said MTU size and a size of an IP packet header included in said IP packet header by $$(\text{IP packet header} + (\text{fixed packet payload} \times N)) \leq \text{MTU size} \quad (1),$$

and posting said IP packet assembling means on the largest number N' of the calculated Ns, wherein said IP packet assembling means is characterized by, on receipt of said posting, assembling the IP packet payloads included in the fixed packets by N' pieces in order from the fixed packet including the head portion of said IP packets and adding the IP packet header created by said IP header processing means to the head of the IP packet payloads to create IP packets, and in the case where the number of the fixed packets created from said N' arises a remainder, from the one inputted earlier to the fragmentation processing device to the one including the last portion of the IP packets, setting the number of said remainder N' and forming IP packets from said N' pieces of fixed packet and then sending the IP packets outside the device.

In one exemplary embodiment the IP packet assembling division is characterized by, after acquiring the N' pieces of fixed packet, creating IP packets in order.

In an exemplary embodiment the above described fixed packet is an ATM cell.

The header division of the fixed packet may include one of information on an input line on which the IP packets were inputted to the device and/or information on an input port in the device to which the fixed packets were inputted, and as for the IP packets assembled from the fixed packets, IP packet assembling means acquires information on an input line and/or information on an input port in the device to which the fixed packets were inputted from the fixed packet header on which the IP packets were written, and outputs the created IP packets to an output line corresponding to the input line to the device and/or the input port in the device to which the fixed packets were inputted.

The fragmentation processing apparatus may have a plurality of the fragmentation processing devices according to one of claims 1 to 5, each of the fragmentation processing device is associated with the input line on which the IP packets are inputted and creates the IP packets from the fixed packets on which the IP packets inputted from the associated input line are divided and written.

The fragmentation processing apparatus may further have a fixed packet separating means, which inputs the fixed packets to a predetermined fragmentation processing device for each of the input lines on which the IP packets are inputted to the device and/or the input ports in the apparatus to which the fixed packets are inputted.

The fragmentation processing apparatus may further have an IP packet integrating device, which outputs the IP packets assembled by the IP packet assembling means to the output line corresponding to the input line on which the IP packets are inputted to the apparatus and/or the input port in the apparatus to which the fixed packets are inputted.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Embodiments of the present invention will be described in detail hereinafter by referring to attached drawings.

A fragmentation processing device 10 and an fragmentation processing apparatus including it will be described in detail hereinafter.

The fragmentation processing device 10 is implemented in an apparatus that accommodates various lines such as an IP over ATM line and a POS (Packet over SONET/SDH) line and executes a transfer process of the IP packets. This apparatus is called a fragmentation processing apparatus.

<Fragmentation Processing Device 10>

Figure 1:
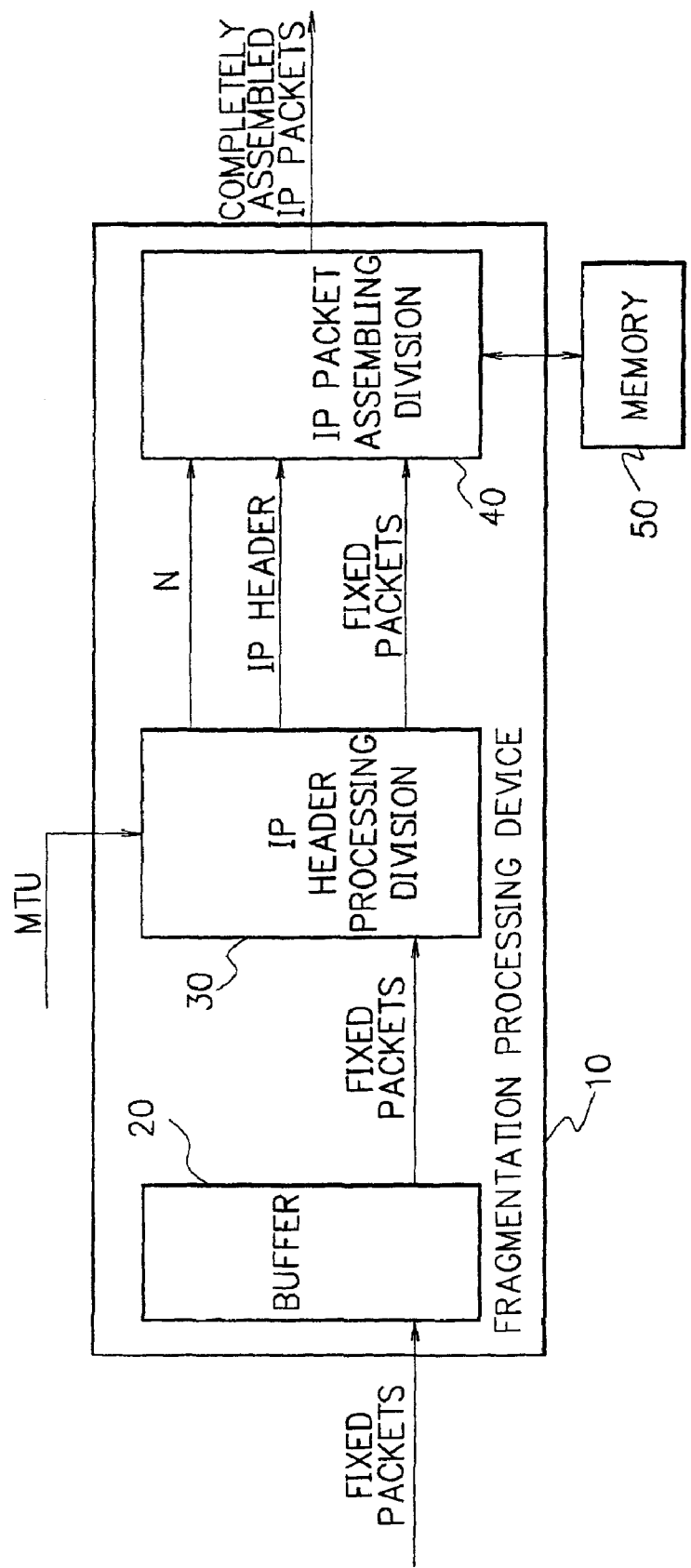
FIG. 1 is a block diagram showing an internal configuration of a fragmentation processing device of the present invention.

The fragmentation processing device 10 assembles the inputted fixed packets into the IP packets of a predetermined size and sends them. As shown in FIG. 1, it has a buffer 20, an IP header processing division 30 and an IP packet assembling division 40.

The fragmentation processing device 10 holds first, the inputted fixed packets by the buffer 20, then determines whether or not to execute the fragmentation process by the IP header processing division 30, and assembles the IP packets based on this determination consequence in the IP packet assembling division 40.

<Buffer 20>

The buffer 20 holds the fixed packets inputted to the fragmentation processing device 10. Moreover, although a method of holding the fixed packets is not limited, it is preferably an FIFO.

In addition, these fixed packets may also be ATM cells used in ATM (Asynchronous Transfer Mode) for instance and are not limited as long as they have header portions (hereinafter, referred to as "fixed packet headers") and payload portions (hereinafter, referred to as "fixed packet payload portions") as shown in FIG. 2(b) and meet the following condition.

The condition is that the fixed packet header includes information on an input physical line number of the IP packets such as an input port number of an IP packet switch.

Even a fixed packet not meeting this condition can also be used if the fragmentation processing device 10 can acquire this information.

Moreover, this fixed packet is created in the case where the fragmentation processing apparatus has received the IP packets. In addition, it may be also that the fragmentation processing device 10 has the IP packets inputted, and when they are inputted, they are divided into fixed packets by an unillustrated fixed packet dividing division.

The fixed packets held by the buffer 20 are erased when read to the IP header processing division 30.

Moreover, in the case of using AAL5 (ATM Adaptation Layer) as the fixed packets, a fixed packet with a PTI field of "001" or "011" is determined as the last fixed packet, and the next fixed packet is determined as head of the fixed packet.

<IP Header Processing Division 30>

The IP header processing division 30 determines whether or not to execute a fragmentation process to the IP packets, and if it determines to do so, it creates an IP packet header.

The IP header processing division 30 reads the fixed packets held in the buffer 20 in order of decreasing length of time being held. It extracts the headers of the IP packets (hereinafter, referred to as "IP packet headers") from the read fixed packet payloads including the IP packet headers. Also, of these IP packet headers, it extracts IP packet header and IP packet. Moreover, it may be also in this case to execute an IP packet header process such as TTL subtractions.

It calculates N from the extracted IP packet header, fixed packet payload and the MTU size by using the following expression (1), and posts the IP packet assembling division 40 on the largest integer N of these Ns (Max.[N]). This N is used to acquire the size (fragmentation size) of the IP packets assembled by the IP packet assembling division 40 as shown by the following expression (2). To be more specific, according to the following expressions (1) and (2), the IP packets created by the IP packet assembling division 40 by combining the IP packet headers and N pieces of fixed packet payload will be smaller than the MTU size.

$$(\text{IP packet header} + (\text{fixed packet payload} \times N)) \leq \text{MTU size} \quad (1)$$

in (1), N=0, 1, 2, 3 . . .

$$\text{Fragmentation size} \leq (\text{IP packet header} + (\text{fixed packet payload} \times N)) \quad (2)$$

in (2), N=0, 1, 2, 3 . . .

The IP header processing division 30 compares the extracted IP packet (length) with the MTU size to examine whether the IP packet exceeds the MTU size. It is not necessary to execute the fragmentation process in the case where the IP packet is equal to or smaller than the MTU size, and it becomes necessary to execute the fragmentation process in the case where it is larger than the MTU size.

Moreover, as for the MTU size, the fragmentation processing apparatus may acquire the size that it obtains by a negotiation process, or the fragmentation processing device 10 may acquire it by executing the negotiation process, or it may also be set in advance in the fragmentation processing apparatus or the fragmentation processing device 10. In the negotiation process, IETF RFC1661 The Point-to-Point Protocol (PPP) is used for instance. The negotiation process is to detect the MRU size of the destination apparatus to which IP packets are sent and determine this size as the MTU size. In addition, in the case of accommodating a plurality of physical lines, the MTU size may be set for each of these physical lines.

Moreover, in this case, the IP header processing division 30 executes a process to the fixed packets such as an output port check. This process may be used one or more in known arts.

In the case where the IP packet length is equal to or smaller than the MTU size, the IP header processing division 30 sends the above-mentioned extracted IP packet headers to the IP packet assembling division 40. It also sends the fixed packets to the IP packet assembling division 40 in order. Moreover, it may be also to read the fixed packets from the head fixed packet to the last fixed packet or the head and last fixed packet from the buffer 20 and output them to the IP packet assembling division 40.

There are the following types of the above-mentioned fixed packets.
(1) Head Fixed Packet It is a fixed packet including the head portion of the IP packets, and includes the IP packet header portion.
(2) Last Fixed Packet It is a fixed packet including the last portion of the IP packets, and a fixed packet inputted to the buffer 20 following this fixed packet is the head fixed packet.
(3) Intermediate Fixed Packets Of the IP packets, they are the fixed packets excluding the head fixed packet and the last fixed packet. They may not exist depending on the length of the IP packets. Data is written to all the payload portions of the fixed packets.
(4) Head and Last Fixed Packet It includes the head portion and the last portion of the IP packets. It occurs in the case where the IP packet size is smaller than the fixed packet size.

Moreover, the IP header processing division 30 may determine a type of the fixed packets depending on whether they have the above properties or not or by a different method. For instance, it is possible to include the above described information on the type of the fixed packets in the header portion of the fixed packets and determine the type by deciphering it.

In the case where the IP packet length is equal to or smaller than the MTU size, the IP header processing division 30 sends the fixed packets read from the buffer 20 to the IP packet assembling division 40.

Moreover, it may be also in this case to the number of the fixed packets from the head fixed packet to the last fixed packet to the IP packet assembling division 40. In this case, if the IP packet assembling division 40 receives the posted number of the fixed packets, it may assemble the IP packets from them.

Furthermore, it may be also to post the IP packet being the size equal to or smaller than the MTU size instead of the number of the fixed packets as described above. In this case, the IP packet assembling division 40 may also detect receipt of the last fixed packet and then assemble the IP packets from these fixed packets. As for whether or not it is the last fixed packet, the IP packet assembling division 40 may determine it as described above, or the IP header processing division 30 may, on sending the last fixed packet, post the IP packet assembling division 40 to the effect that it has sent it so that the IP packet assembling division 40 will determine it based on that posting.

In the case where the IP packet length is of a size exceeding the MTU size, the IP header processing division 30 executes an IP packet header process to the above extracted IP packet header to create a new IP packet header and holds it. This IP packet header process is a process required on the fragmentation processing, and there is a process described in IETF RFC1812 Requirements for IP version 4 Routers for instance though it differs depending on the IP packet specifications. Moreover, it may be also to execute an IP packet header process not derived from the fragmentation process such as recalculation of a header check sum. The generated IP packet header can be replaced with the IP packet header included in the payload portion of the head fixed packet. This head fixed packet is sent to the IP packet assembling division 40.

The IP header processing division 30 sends the fixed packets read from the buffer 20 to the IP packet assembling division 40 in order. Moreover, it may be also, after reading N pieces of fixed length IP packet including the head fixed packet, to send them collectively to the IP packet assembling division 40.

Next, it sends the intermediate fixed packets from the N+1st piece from the above head of the fixed packet to the N+N-th piece to the IP packet assembling division 40 in order. In addition, it generates new IP packet headers from the above extracted IP packet headers thereinafter and sends them to the IP packet assembling division 40. It repeats this process. Moreover, it may be also, after reading the above N pieces of fixed length IP packet, to send them to the IP packet assembling division 40.

In the case of having read the last fixed packet from the buffer 20, it generates IP packet headers thereinafter and sends them to the IP packet assembling division 40. Moreover, it may be also, in the case of reading up to N pieces of fixed packet from the buffer 20 and then sending them to the IP packet assembling division 40 as described above, if the last fixed packet is read from the buffer 20 before reading the N pieces of fixed packet, to send the fixed packets up to the last fixed packet to the IP packet assembling division 40.

The IP header processing division 30 checks whether the fixed packets are those inputted in the buffer 20 according to the following sequence. This sequence will be as shown by the following (a) to (c):

(a) The fixed packets were inputted in the order of the head fixed packet, one or more intermediate fixed packets and the last fixed packet.

(b) The fixed packets were inputted in the order of the head fixed packet and the last fixed packet.

(c) Only the head and last fixed packet was inputted.

To be more specific, the above sequence is for the purpose of determining whether the IP packets were inputted to the IP header processing division 30 in the order in which the IP packets were divided into the fixed packets. The fixed packets inputted according to this sequence are processed as above as a normal sequence, and those not inputted according to it are treated as an abnormal sequence set forth below.

In the case where the fixed packets are inputted to the IP header processing division 30 in an abnormal sequence, the IP header processing division 30 executes a predetermined process to these fixed packets. This predetermined process may be any process, which may be for instance scrapping all the fixed packets inputted before inputting the next head fixed packet.

<IP Packet Assembling Division 40>

The IP packet assembling division 40 assembles the fixed packets inputted from the IP header processing division 30 into the IP packets of the MTU size or smaller based on the N and the IP header inputted as described above. The assembled IP packets are sent to a predetermined destination based on the above described input physical line number and/or fixed packet SW input port according to a method of one of or 2 more of known arts. This method of assembling the fixed packets may be one or more in the known arts, and these fixed packets just have to be connected in the order in which they were inputted to the device.

A memory 50 can be either in the fragmentation processing device 10 or an external memory.

<In the Case of the IP Packet of the MTU Size or Smaller>

The IP packet assembling division 40 removes the fixed packet header from the fixed packets inputted from the IP header processing division 30 and stores the fixed packet payload in the memory 50. In the case of having received the last fixed packet, it reads the fixed packet payloads stored in the memory 50 and assembles them into one IP packet. As for this method of assembling, a method of known arts may be used. It determines whether or not it is the last fixed packet as described above. It may be also that the IP header processing division 30 posts the number of the fixed packets from the head fixed packet to the last fixed packet to the IP packet assembling division 40, and based on this posting, if the fixed packets of this number are inputted, it is determined as the last fixed packet. In addition, it may be also that, in the case where the IP header processing division 30 sends the last fixed packet, it is posted to that effect so that the determination is made based on that posting. The fixed packet payloads stored in the memory 50 are erased when read as described above.

Moreover, it may be also for the IP packet processing division to store the fixed packets inputted from the IP header processing division 30 in the memory 50 and remove the fixed packet header after or when reading them therefrom.

<In the Case of the IP Packet Exceeding the MTU Size>

The IP packet assembling division 40 removes the fixed packet header from the fixed packets inputted from the IP header processing division 30 and stores the fixed packet payloads in the memory 50. It repeats this process N times. This repetition can be measured by using a counter.

In the case of having stored N pieces of fixed packet payload in the memory 50, the IP packet assembling division 40 reads these fixed packet payloads and assembles them into one IP packet. The assembled IP packet is sent outside the apparatus. This method of assembling may be one or more in known arts. So the method described in the IETF RFC1812 Requirements for IP version 4 Routers may be used for instance. This process is repeated in order. Also, the fixed packet payloads stored in the memory 50 are erased when read by the IP packet assembling division 40.

It may be also for the IP packet processing division to store the fixed packets inputted from the IP header processing division 30 in the memory 50 and remove the fixed packet header after or when reading them therefrom.

<In the Case of Including the Head Fixed Packet>

In the case of assembling an IP packet from the fixed packet payloads including the head fixed packet payload, it reads up to N-th piece of the fixed packet payloads from the head fixed packet payload from the memory 50 in order and assembles them into the IP packet.

<In the Case of the Intermediate Fixed Packets Only>

Here, in the case where there is no head fixed packet payload in the fixed packets read from the memory 50 and there are only the intermediate fixed packet payloads, the IP packet assembling division 40 reads the intermediate fixed packet payloads in the order in which they were stored in the memory 50 and assembles them into the IP packet payload in this order. In addition, the IP packet header is inputted from the IP header processing division 30 as described above, and the IP packet header being held is embedded into the head of the IP packet payloads to assembles the IP packet.

<In the Case of Including the Last Fixed Packet>

In addition, in the case where the last fixed packet is inputted from the IP header processing division 30, the IP packet assembling division 40 assembles the IP packet payload as described above from this fixed packet payload and the fixed packet payload stored in the memory 50. It embeds the IP packet header held as described above at the head of this IP packet to assemble an IP packet. The determination of whether it is the last fixed packet or not can be made by using any method, such as using the fixed packet header, determining it by length of data described on the fixed packet payload or being posted from the IP header processing division 30 and determining it based on it.

<Fragmentation Processing Apparatus>

Figure 3:
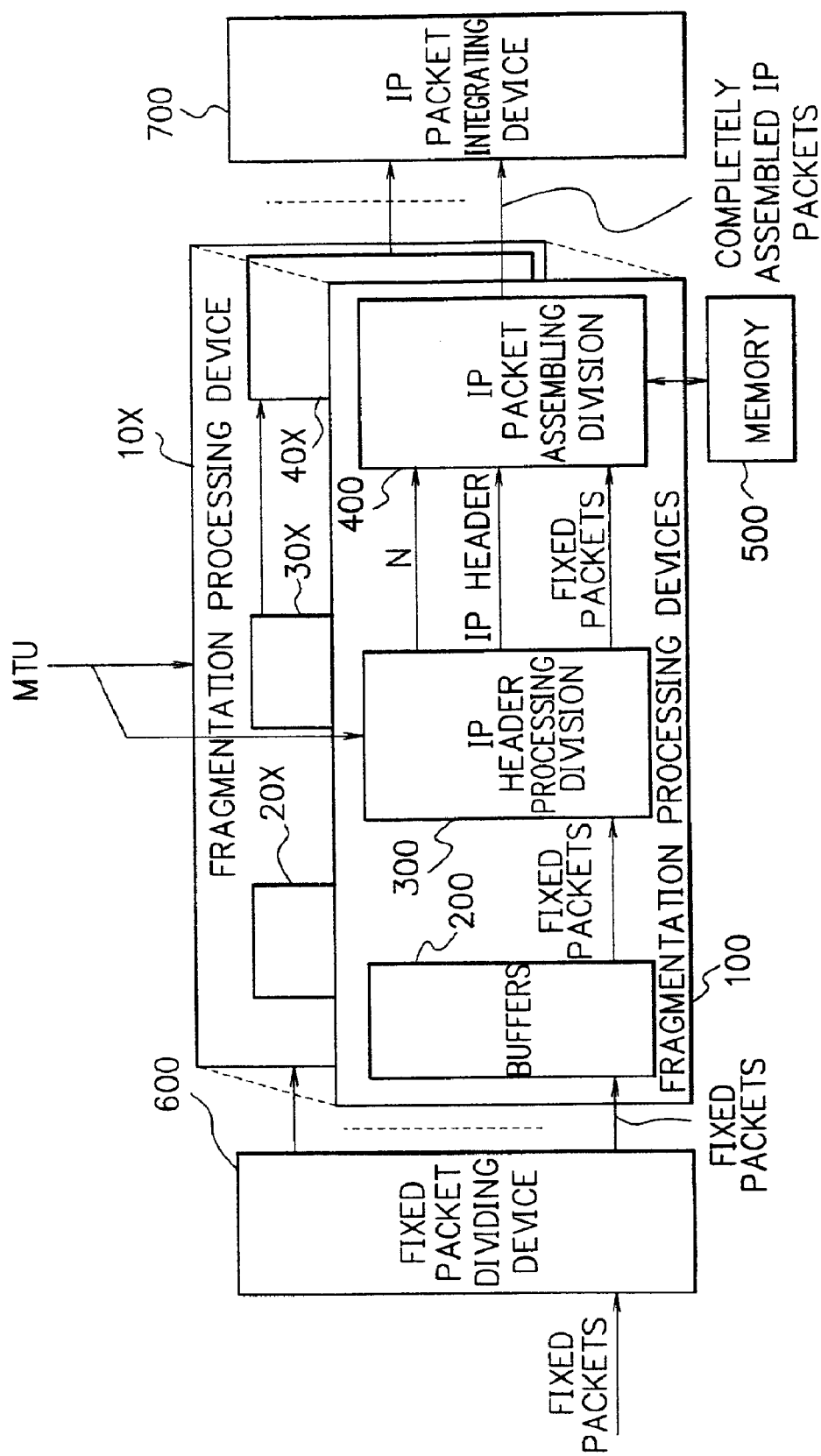
FIG. 3 is a block diagram showing an internal configuration of a fragmentation processing apparatus of the present invention.

As shown in FIG. 3, the fragmentation processing apparatus has a fixed packet dividing device 600, fragmentation processing devices 100 to 10X and an IP packet integrating device 700.

In addition, as described above, the fragmentation processing apparatus can divide the IP packet by an unillustrated fixed packet dividing division, and apart from this, an unillustrated fixed packet assembling apparatus can generate the fixed packets.

The fixed packet dividing device 600 is intended to input the inputted fixed packets by dividing them among a plurality of fragmentation processing devices 100 to 10X. This division is performed for each of the input lines on which the IP packet is inputted. The input physical lines on which the IP packet is inputted are determined based on the input line number information or the number of fixed packet SW ports. The input line number information or the number of fixed packet SW ports can be acquired by any method, by having the input line number information or the number of fixed packet SW ports described on the fixed packet header as described above and determining based on it or by being posted from an unillustrated control line, for instance. As described above, the fixed packets are divided among predetermined fragmentation processing devices 100 for each of the input line number information or the fixed packet SW ports.

The fragmentation processing devices 100 to 10X have buffers 200 to 20X, IP header processing divisions 300 to 30X and IP packet assembling divisions 400 to 40X as described above respectively. These perform the above described operations and assemble the IP packet from the fixed packets. The assembled IP packet is outputted to the IP packet integrating device.

Moreover, as described above, the memory 500 can exist in the fragmentation processing devices 100 to 10X or outside the fragmentation processing devices 100 to 10X or outside the fragmentation processing apparatus.

The number of pieces X of the fragmentation processing devices 100 to 10X is equal to the number of input physical lines or the number of fixed packet SW input ports, and as shown in FIG. 3, they are connected in parallel respectively.

The IP packet integrating device 700 sends the IP packets outside the apparatus in the order in which they are inputted from the fragmentation processing devices 100 to 10X. Thus, the IP packets divided among the fragmentation processing devices 100 to 10X become one IP packet flow. Moreover, as aforementioned, the destination of these IP packets is a predetermined output physical line associated with each of the input line number information or the fixed packet SW ports.

Moreover, the fragmentation processing apparatus does not need to have all the above devices. For instance, it may be configured as follows.

The fixed packet dividing device 600 and the fragmentation processing devices 100 to 10X, the fixed packet dividing device 600 and the fragmentation processing devices 100 to 10X and the memory 500, the fixed packet dividing device 600 and the fragmentation processing devices 100 to 10X and the IP packet integrating device 700, the fragmentation processing devices 100 to 10X and the IP packet integrating device 700 or the fragmentation processing devices 100 to 10X and the IP packet integrating device 700 and the memory 500.

And other devices may be added external devices.

<Example of Fragmentation Processing>

Figure 2:
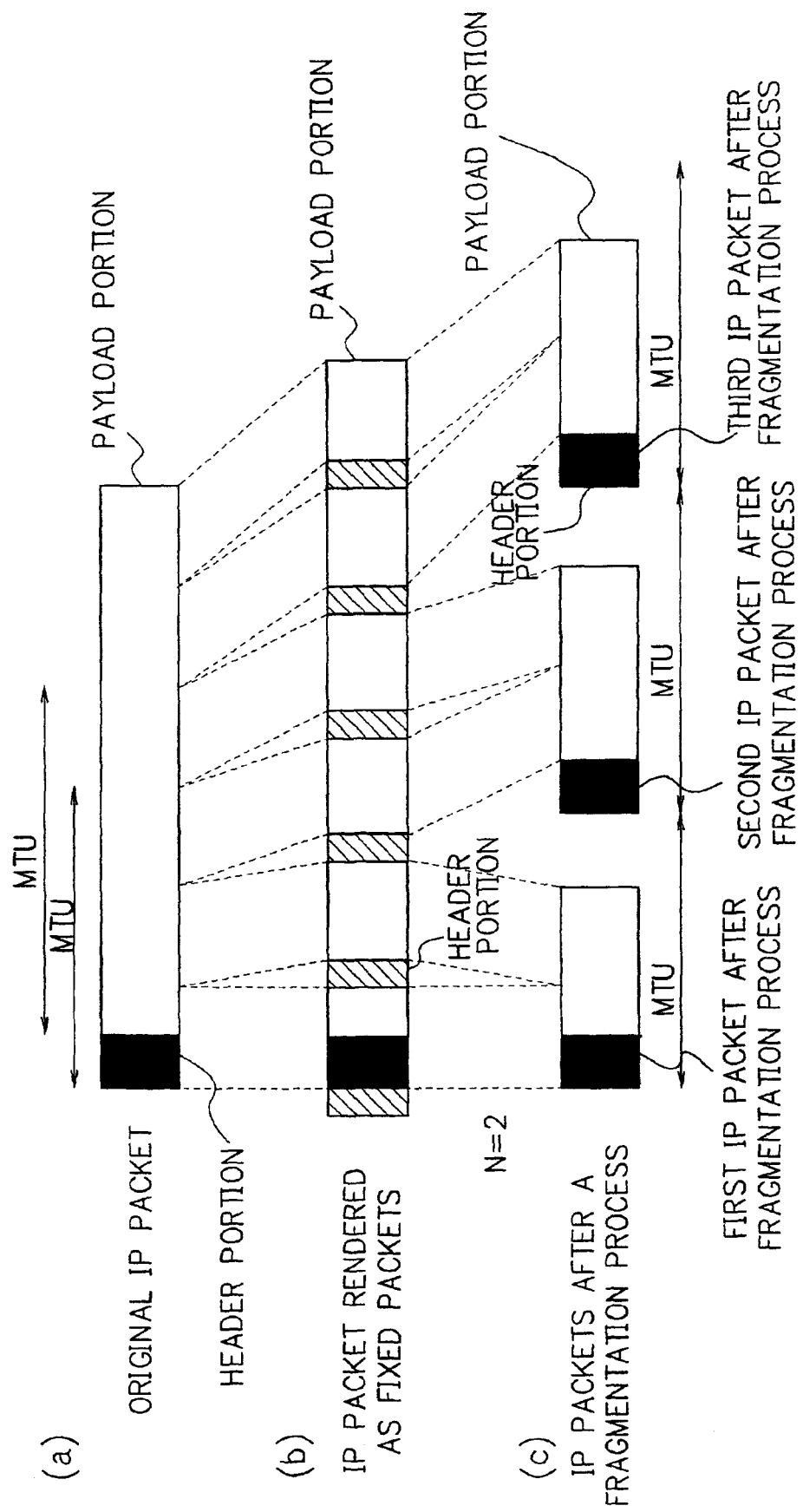
FIG. 2 is a diagram for describing a fragmentation process of the present invention.

FIG. 2 shows an example in which the fragmentation processing device of the present invention creates the IP packets of the MTU size or smaller from the fixed packets.

The IP packet shown in FIG. 2(*a*) is an IP packet inputted to the fragmentation processing apparatus. This IP packet is divided into fixed packets in the fragmentation processing apparatus as shown in FIG. 2(*b*). Here, it is divided into six fixed packets.

According to the MTU size shown in FIG. 2(*c*), the above described N is 2. Therefore, the IP packet shown in FIG. 2(*a*) is divided into the IP packets of the MTU size or smaller shown in (*c*) by creating one IP packet from two fixed packet payloads.

Moreover, in the case where there are seven fixed packets, this number of fixed packets is indivisible by N and a remainder of 1 arises. Therefore, as for the fixed packet of the remainder of 1, an IP packet is created assuming that N is 1 from the fixed packet including the last portion of the IP packet in the fixed packet payload. To be more specific, an IP packet wherein the above described IP packet header is added to the head is created at the last portion of this IP packet.

As apparent from the above description, the fragmentation processing device of the present invention creates the IP packets at a point in time when it acquires a predetermined number of fixed packets so as to reduce the time required for the fragmentation process. In addition, it accelerates fragmentation processing because it executes the fragmentation process by hardware, that is, the above described fragmentation processing determination means, IP header processing means and IP packet assembling means. Furthermore, as it executes the fragmentation process by hardware, it is possible to accelerate processing speed by an easy operation of replacing a component, which also improves maintainability.

In addition, according to the fragmentation processing device of the present invention, it suffices to provide the fragmentation processing device on the output line side of the IP packet, and it is no longer necessary to provide one on the input line side. Thus, it is possible to relieve the processing on the input line side.

What is claimed is:

1. A fragmentation processing device for having fixed packets with IP (internet protocol) packets divided into payload portions written inputted in order from one including a head portion of the IP packets to one including a last portion thereof, comprising a fragmentation processing determination means, an IP header processing means and IP packet assembling means:

the fragmentation processing determination means for acquiring, from the fixed packets including an IP packet header of said IP packets, information on a size of the IP packets included in the IP packet header, comparing the size of the IP packets with an MTU (Maximum Transfer Unit) size, and determining, in the case where the size of the IP packets is larger than the MTU size, that said IP packets require to have a fragmentation process executed;

the IP header processing means for, in the case where it is determined by the fragmentation processing determination means that said IP packets require to have a fragmentation process executed, extracting the IP packet header from the fixed packets including the IP packet header, and creating an IP packet header after the fragmentation process from the IP packet header; and the IP packet assembling means for, in the case where it is determined by said fragmentation processing determination means that said IP packets require to have a fragmentation process executed, creating a plurality of IP packets of a size smaller than said MTU size to which IP packet payloads of the IP packets included in said fixed packets are added behind the IP packet header created by said IP header processing means in the order in which they are inputted to said fragmentation processing device, sending these IP packets, and in the case where it is determined by the fragmentation processing determination means that said IP packets do not require to have a fragmentation process executed, assembling IP packets from said fixed packets in the order in which they are inputted to said fragmentation processing device and sending them outside the device.

2. The fragmentation processing device according to claim 1, wherein header division of said fixed packets includes at least one of information on an input line on which the IP packets are inputted and information on an input port of the fixed packets; and said IP packet assembling means is characterized by, as for the IP packets assembled from said fixed packets, acquiring at least one of information on the input line and information on the input port of the fixed packets from the fixed packet header on which said IP packets are written, and outputting said created IP packets to an output line corresponding to the input line and said input port of the fixed packets.

3. A fragmentation processing apparatus having a plurality of the fragmentation processing devices according to claim 1, wherein each of the fragmentation processing devices is characterized by being associated with the input line on which the IP packets are inputted and creating the IP packets from the fixed packets on which the IP packets inputted from the associated input line are divided and written.

4. A fragmentation processing apparatus having a plurality of the fragmentation processing devices according to claim 1, wherein each of the fragmentation processing devices is characterized by being associated with the input line on which the IP packets are inputted and creating the IP packets from the fixed packets on which the IP packets inputted from the associated input line are divided and written, said fragmentation processing apparatus further comprising a fixed packet separating device, wherein the fixed packet separating device is inputting the fixed packets to said fragmentation processing device for each of the input lines on which the IP packets are inputted and the input ports to which the fixed packets are inputted.

5. A fragmentation processing apparatus according to claim 1, said fragmentation processing apparatus further comprising an IP packet integrating device, wherein the IP packets assembled by said IP packet assembling means are outputted to the input line on which the IP packets are inputted and the output line corresponding to the input port of the fixed packets.

6. The fragmentation processing device according to claim 1, wherein said IP packet assembling division is characterized by, after acquiring N' pieces of fixed packet, creating IP packets in order.

7. The fragmentation processing device according to claim 1, wherein said fixed packet is characterized by being an ATM cell.

8. A fragmentation processing device for having fixed packets with IP (internet protocol) packets divided into payload portions written inputted in order from one including a head portion of the IP packets to one including a last portion thereof, comprising a fragmentation processing determination means, an IP header processing means, an IP packet assembling means and a number of assembled fixed packets calculating means:

the fragmentation processing determination means for acquiring, from the fixed packets including an IP packet header of said IP packets, information on a size of the IP packets included in the IP packet header, comparing the size of the IP packets with an MTU (Maximum Transfer Unit) size, and determining, in the case where the size of the IP packets is larger than the MTU size, that said IP packets require to have a fragmentation process executed;

the IP header processing means for, in the case where it is determined by the fragmentation processing determination means that said IP packets require to have a fragmentation process executed, extracting the IP packet header from the fixed packets including the IP packet header, and creating an IP packet header after the fragmentation process from the IP packet header;

the IP packet assembling means for, in the case where it is determined by said fragmentation processing determination means that said IP packets require to have a fragmentation process executed, creating a plurality of IP packets of a size smaller than said MTU size to which IP packet payloads of the IP packets included in said fixed packets are added behind the IP packet header created by said IP header processing means in the order in which they are inputted to said fragmentation processing device, sending these IP packets, and in the case where it is determined by the fragmentation processing determination means that said IP packets do not require to have a fragmentation process executed, assembling IP packets from said fixed packets in the order in which they are inputted to said fragmentation processing device and sending them outside the device; and the number of assembled fixed packets calculating means for, in the case where it is determined by said fragmentation processing determination means that said IP packets require to have a fragmentation process executed, calculating N from a payload size of the fixed packets, said MTU size and a size of an IP packet header included in said IP packet header by $$(\text{IP packet header} + (\text{fixed packet payload} \times N)) \leq \text{MTU size} \quad (1),$$

and posting said IP packet assembling means on the largest number N' of the calculated Ns, wherein said IP packet assembling means is characterized by, on receipt of said posting, assembling the IP packet payloads included in the fixed packets by N' pieces in order from the fixed packet including the head portion of said IP packets and adding the IP packet header created by said IP header processing means to the head of the IP packet payloads to create IP packets, and in the case where the number of the fixed packets created from said N' arises a remainder, from the one inputted earlier to the fragmentation processing device to the one including the last portion of the IP packets, setting the number of said remainder N' and forming IP packets from said N' pieces of fixed packet and then sending the IP packets outside the device.

9. The fragmentation processing device according to claim 8, wherein said header division of said fixed packets includes at least one of information on an input line on which the IP packets are inputted and information on an input port of the fixed packets; and said IP packet assembling means is characterized by, as for the IP packets assembled from said fixed packets, acquiring at least one of information on the input line and information on the input port of the fixed packets from the fixed packet header on which said IP packets are written, and outputting said created IP packets to an output line corresponding to the input line and said input port of the fixed packets.

10. The fragmentation processing apparatus having a plurality of the fragmentation processing devices according to claim 8, wherein each of the fragmentation processing devices is characterized by being associated with the input line on which the IP packets are inputted and creating the IP packets from the fixed packets on which the IP packets inputted from the associated input line are divided and written.

11. The fragmentation processing apparatus having a plurality of the fragmentation processing devices according to claim 8, wherein each of the fragmentation processing devices is characterized by being associated with the input line on which the IP packets are inputted and creating the IP packets from the fixed packets on which the IP packets inputted from the associated input line are divided and written, said fragmentation processing apparatus further comprising a fixed packet separating device, wherein the fixed packet separating device is inputting the fixed packets to said fragmentation processing device for each of the input lines on which the IP packets are inputted and the input ports to which the fixed packets are inputted.

12. The fragmentation processing device according to claim 8, wherein said IP packet assembling division is characterized by, after acquiring said N' pieces of fixed packet, creating IP packets in order.

13. The fragmentation processing device according to claim 8, wherein said fixed packet is characterized by being an ATM cell.

14. The fragmentation processing apparatus according to claim 8, wherein said fragmentation processing apparatus further comprising an IP packet integrating device, wherein the IP packets assembled by said IP packet assembling means are outputted to the input line on which the IP packets are inputted and the output line corresponding to the input port of the fixed packets.

* * * * *